(12) United States Patent
Rayman

(10) Patent No.: US 6,357,498 B1
(45) Date of Patent: Mar. 19, 2002

(54) TIRE WITH REMOVABLE TIRE TREAD BELT AND IMPROVED APEX DESIGN

(75) Inventor: William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/424,087

(22) PCT Filed: May 20, 1997

(86) PCT No.: PCT/US97/08495

§ 371 Date: Nov. 18, 1999

§ 102(e) Date: Nov. 18, 1999

(87) PCT Pub. No.: WO98/52779

PCT Pub. Date: Nov. 26, 1998

(51) Int. Cl.[7] .......................... B60C 11/02; B60C 13/00; B60C 15/00; B60C 15/06

(52) U.S. Cl. ...................... 152/167; 152/176; 152/188; 152/209.6; 152/539; 152/541; 152/547; 152/555

(58) Field of Search ................................. 152/553, 542, 152/541, 539, 188, 169, 454, 167, 176, 209.6

(56) References Cited

U.S. PATENT DOCUMENTS

| | | |
|---|---|---|
| 1,054,820 A | 3/1913 | Bowden |
| 1,494,621 A | 5/1924 | Ogilvie |
| 2,609,026 A | 9/1952 | Luchinger-Caballero |
| 2,990,867 A | 7/1961 | Barassi |
| 3,018,810 A | 1/1962 | Barassi |
| 3,087,526 A | 4/1963 | Barassi et al. |
| 3,107,713 A | 10/1963 | Cushman |
| 3,224,482 A | 12/1965 | Barassi et al. |
| 3,224,483 A | 12/1965 | Gross et al. |
| 3,612,137 A | * 10/1971 | Guyot ..................... 152/362 |
| 3,897,814 A | 8/1975 | Grawey |
| 3,970,493 A | 7/1976 | Grawey |
| 4,050,495 A | 9/1977 | Olsen |
| 4,057,302 A | * 11/1977 | Caravito ..................... 305/19 |

(List continued on next page.)

FOREIGN PATENT DOCUMENTS

| | | |
|---|---|---|
| DE | 1505157 | 7/1969 |
| EP | 0202925 | 5/1986 |
| EP | 0206679 | 6/1986 |
| EP | 0251145 | 6/1987 |
| EP | 0313500 | 10/1988 |
| EP | 0670229 | 2/1995 |
| FR | 540291 | 4/1922 |
| FR | 1124766 | 7/1956 |
| GB | 1322281 | 7/1970 |
| GB | 2073109 | 1/1981 |
| JP | 4-11506 | 4/1990 |
| JP | 06183224 | * 7/1994 |
| JP | 06320922 | 11/1994 |
| JP | 07117419 | 5/1995 |
| JP | 08162820 | 8/1996 |

Primary Examiner—Adrienne C. Johnstone
Assistant Examiner—Justin Fischer
(74) Attorney, Agent, or Firm—Howard M. Cohn

(57) ABSTRACT

An improved track belt tire is constructed of a removable tread belt assembly mounted to a tire carcass with an embedded carcass ply having ply turnup ends about the bead wires. First, second, third, and fourth apex elements are disposed about each of the bead wires. The first of the apex elements is located adjacent and radially outward from each of the bead wires. The second of the apex elements is located between the overlying sides of the turnup ply. The third of the apex elements is disposed against the axially inwardly facing sides of the turnup ends of the carcass ply and the fourth of the apex elements is located against outwardly facing sides of the ply turnup ends of the carcass ply to encase the end portions of the ply turnup ends between the second and fourth apex elements.

10 Claims, 3 Drawing Sheets

U.S. PATENT DOCUMENTS

| | | |
|---|---|---|
| 4,071,068 A | 1/1978 | Olsen |
| 4,092,196 A | 5/1978 | Miller et al. |
| 4,269,646 A | 5/1981 | Miller et al. |
| 4,286,644 A | 9/1981 | Pond, Jr. |
| 4,304,618 A | 12/1981 | Abbott |
| 4,351,380 A | 9/1982 | Pillod, Jr. et al. |
| 4,474,633 A | 10/1984 | Watts |
| 4,480,670 A | 11/1984 | Payne |
| 4,609,023 A | 9/1986 | Loser |
| 4,846,238 A | 7/1989 | Kadota et al. |
| 5,236,031 A | 8/1993 | Honbo et al. |
| 5,261,474 A * | 11/1993 | Lobb .......................... 152/454 |
| 5,622,576 A * | 4/1997 | Lobb .......................... 152/454 |

\* cited by examiner

TIRE WITH REMOVABLE TIRE TREAD BELT AND IMPROVED APEX DESIGN

TECHNICAL FIELD

This invention relates to pneumatic tires with track belts and more particularly to an improved removable track belt pneumatic tire constructed of a removable track belt mounted on an improved radially reinforced beaded tire carcass and typically for use with earthmoving vehicles.

BACKGROUND OF THE INVENTION

The track belt pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art track belt tire assemblies comprise a plurality of ground-engaging shoes spaced about the periphery of the supporting structure. The heavy loads on the shoes result in great stresses being developed that sometimes lead to premature tire failure. The U.S. Pat. No. 4,351,380 patent is directed to an improved track belt assembly which comprise a plurality of shoes spaced about the periphery of a load-supporting structure and secured to a reinforcing belt structure disposed on the side of the shoe opposite the ground-engaging side thereof.

The large pneumatic tires, which are typically used for earthmoving vehicles, sometimes fail due to the high stress and loads caused by the harsh environmental conditions in which they are operated. These large prior art pneumatic tires had a greater tendency to fail in one of three tire locations or areas than because of other sources of failure. The first problem area was that the turnup end of the ply would sometimes break through the sidewall of the tire. A second problem area was a tire failure in the bead area. The third problem area was a tendency to fail in the crown and/or shoulder area of the tire.

In the prior art, conventional solutions to these problems include increasing the gauge of the sidewall to increase the bending stiffness, increasing bead area stiffness and robustness, and decreasing tire deformation under load by increasing the sidewall stiffness. To further improve tire durability, the ply turnup portion of tires was typically reinforced.

In U.S. Pat. No. 4,609,023, having a common assignee with the present invention, the sidewall inserts were incorporated in the tire carcass to allow the ply structure to conform to its natural shape when the tire is inflated.

With the continual drive to improve earthmover performance, there is a continuing need to provide novel methods and tire designs for improving earthmover tire durability. The present invention is directed to an improved pneumatic tire and removable track belt assembly with which the frequency of premature tire failure is thought to be substantially reduced. The present invention is also directed to providing an improved pneumatic tire and track belt assembly which is designed to allow large tires to be transported in several sections and then assembled at the construction site to ease the otherwise difficult problem of transporting the large tires, i.e. sometimes over 13 feet in height and approximately 8,000 to 15,000 pounds. Moreover, the present invention relates to an improved pneumatic tire and removable track belt assembly with which the driving characteristics of the tire can be more economically changed and the inventory of the number of tire spares that are typically needed can be reduced.

OBJECTS AND SUMMARY OF THE INVENTION

It is an object of the present invention to provide a pneumatic tire for an earthmover vehicle, the pneumatic tire being as defined in one or more of the appended claims and, as such, having the capability of being constructed to accomplish one or more of the following subsidiary objects.

It is another object of the present invention to provide an improved tire and removable track belt assembly for an earthmover vehicle wherein the frequency of premature tire failure has been substantially reduced.

Another object of the present invention is directed to providing an improved tire and removable track belt assembly which is designed to allow large tires to be transported in several sections and then assembled at the delivery site.

Still another object of the present invention is to provide an improved tire and removable track belt assembly with which the driving characteristics of the tire can be quickly and economically changed.

Yet another object of the present invention is to provide an improved tire and removable track belt assembly with which the number of tire spares that are stored in inventory can be reduced.

Still another object of the present invention is to provide an improved tire and removable track belt assembly with a unique turnup ply construction in the tire carcass that reduces the likelihood of tire failure caused by: a) one of the turnup ends of the carcass ply breaking through a sidewall of the tire; b) failure of the tire in the bead area; and c) failure of the tire in the crown and upper shoulder areas of one of the sidewalls.

In accordance with an embodiment of the invention, an improved track belt tire is constructed of a removable tread belt assembly mounted to the outer circumferential surface of an inflatable load support structure. The load support structure includes an inflatable tire carcass comprised of at least a single ply layer and a pair of spaced apart bead wires. The ply layer includes a first carcass ply extending circumferentially about the tire carcass and between the pair of bead wires. A pair of sidewall portions extend from the bead wires to the outer circumferential surface of the load support structure. The single carcass ply is embedded within and extends entirely about the circumference of the tire carcass and has its ends extending axially outwards and turned up about the bead wires. First, second, third, and fourth apex elements are disposed radially above each of the bead wires with the first of the apex elements being located adjacent each of the bead wires, the second of the apexes being located between overlying sides of the turnup ends of the carcass ply, the third of the apexes being located between the section of the inner surface of the carcass ply as it approaches the bead wires and the axially inner sides of the turnup ends of the carcass and the fourth of the apexes being located against the outer sides of the turnup ends of the carcass ply so that the turnup ends are encased within the second and fourth apexes.

Also in accordance with the invention, the first apex is constructed of a first elastomer which is stiffer by least 20% to about 50% than the second elastomer from which the second, third and fourth of the apexes are constructed.

Further in accordance with the invention, an interlocking structure is provided to secure the removable tread belt assembly to the inflatable load support structure. The interlocking structure includes an interlocking belt structure on the inner surface of the removable tread belt assembly for engaging complementary interlocking support structure on the outer circumferential surface of the inflatable load support structure. The interlocking tread structure comprises a plurality of circumferentially extending lands and grooves and the interlocking support structure comprises a plurality of circumferentially extending lands and grooves oriented to engage complementary ones of the circumferentially extending lands and grooves on the inner surface of the removable tread belt assembly to prevent axial movement of the removable tread belt assembly with respect to the outer circumferential periphery of the inflatable load support structure.

DEFINITIONS

Figure 1:
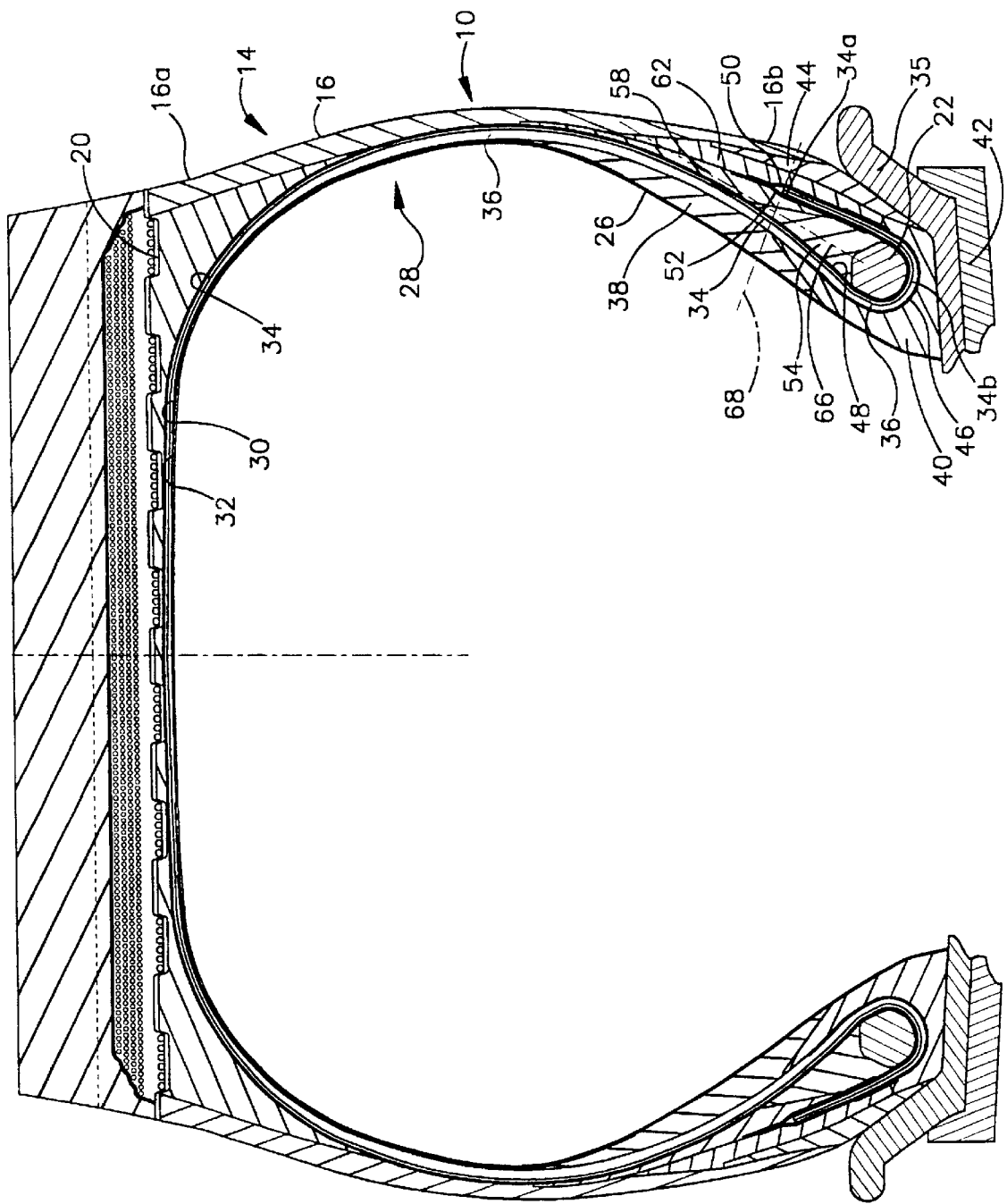
FIG. 1 is a cross-sectional view illustrating the improved tire a with removable tire tread belt mounted on an inflatable tire carcass and made in accordance with the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about 25°–50° angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead wire of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial and " "radially" means directions extending radially toward or away from the axis of rotation of the tire.

"Radial-ply tire" means a belted or circumferentially-restricted pneumatic tire in which the ply cords which extend from bead to bead are laid at cord angles between 650° and 90° with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of improved track belt pneumatic tire 10 which in the specific embodiment illustrated is a size 60/80R63 and/or a 70/68R63 earthmover tire. The size 60/80R63 tire has a 162 inch (411.48 cm) maximum inflated outside diameter, a 60.00 inch (152.40 cm) maximum inflated width tire in the axial directions, and a nominal bead diameter of 63 inches (160.02 cm). The size 70/68R63 tire has a 162 inch (411.45 cm) maximum inflated outside diameter, a 70.0 inch (177.80 cm) maximum inflated width tire in the axial directions, and a nominal bead diameter of 63 inches (160.02 cm). The tires are typically inflated to a pressure of about 100 pounds per square inch (psi) with air and sometimes with an air/nitrogen mixture.

The improved track belt pneumatic tire 10 includes a ground engaging, circumferentially extending track belt 12 mounted on a radially reinforced, beaded tire carcass 14. The beaded tire carcass 14 generally includes a pair of tire sidewalls 16,18 extending radially inwardly from the outer circumferential surface 20 of the tire carcass and terminating at their radial extremities in a pair of bead wires 22,24, respectively. The sidewalls 16, 18 each have an upper portion 16a, 18a, respectively, in the shoulder region of tire carcass 14 and radially inward of the maximum section width of the tire carcass, and a lower portion 16b, 18b, respectively, adjacent the bead wires 22, 24, respectively, and radially inward of the maximum section width of the tire carcass 14. The details of the construction of tire carcass 14 are described in detail hereinafter.

Tire Carcass

Figure 2:
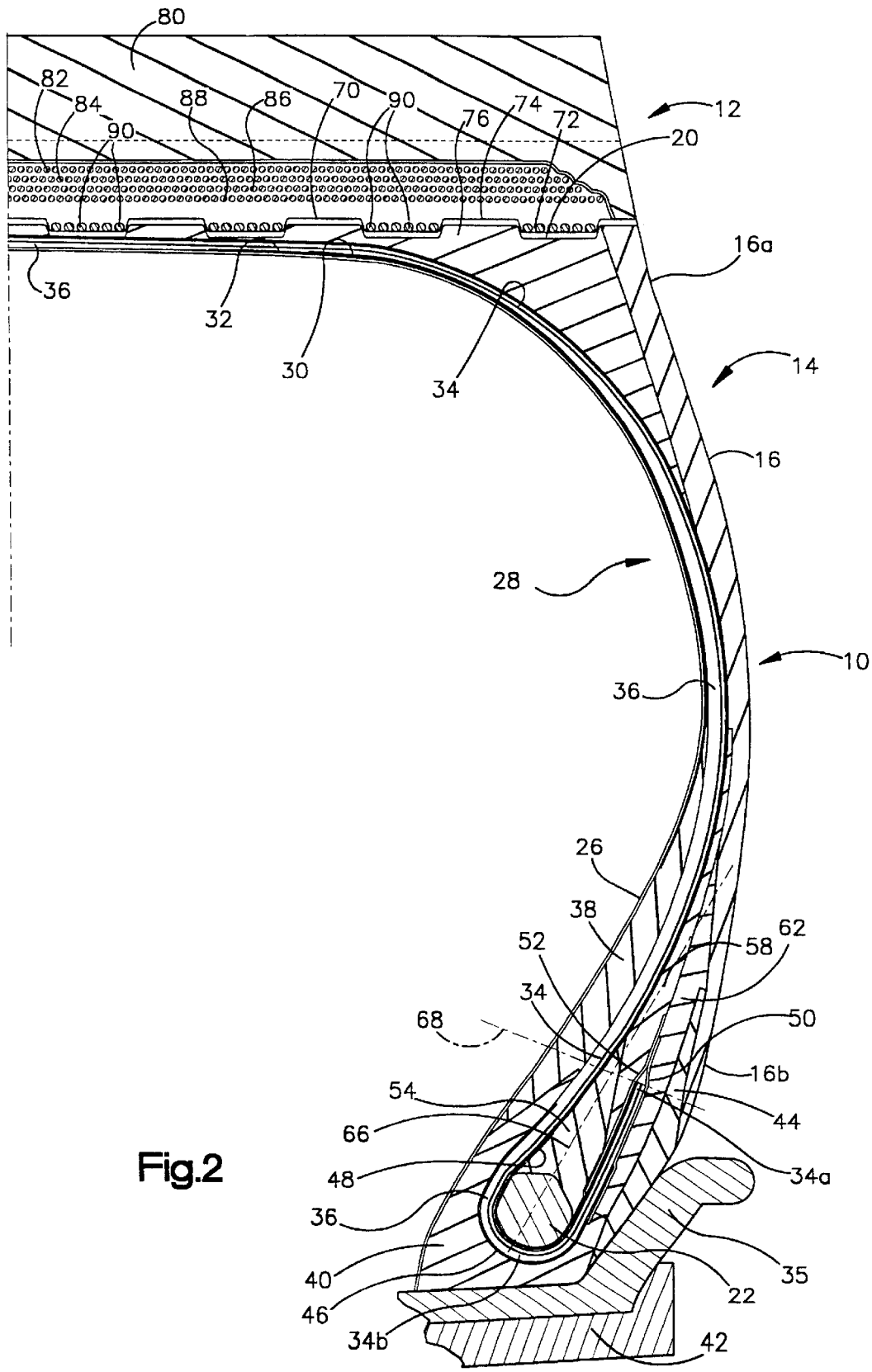
FIG. 2 is an enlarged, cross-sectional view illustrating one side or half of the symmetrical tire shown in FIG. 1 and made in accordance with the present invention.

Referring FIGS. 1 and 2, the details of tire carcass 14 are illustrated. The axially inward surface 28 is a inner ply liner 26 which forms an innerliner that holds the air pressure for inflating tire 10. The inner ply liner 26 covers the entire interior facing surface 28 of the tire carcass 14 and serves to hold the air within the carcass that is used to inflate tire 10. Fabric barrier plies 30 and 32 are provided within the tire carcass 12 in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between one and four barrier plies, as needed for a specific design.

The carcass 14 also includes in its construction at least one rubberized laminated ply layer 34 of tire cord fabric which extends radially inwardly from the outer circumferential surface 20 of the tire carcass, also called the crown area of the tire carcass, and has turnup ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material. The location of the turnup ends 34a and 34b with respect to the flange 35 of the tire mounting rim 42 and the bead wires 22 and 24, respectively, is a significant aspect of the invention and will be discussed in more detail below.

Between the innerliner 26 and the ply layer 34 is a barrier rubber layer 36 which backs up the entire length of ply layer 34 and is formed of a soft compound of rubber which squeezes against the ply layer 34. Annular stiffeners, known as apexes or apex elements 38,39 herein, each having a generally triangular shape are provided radially outward of the bead wires 22,24, respectively, and between the barrier rubber 36 and the innerliner 26. The apexes 38,39 extend from approximately the mid-sidewall and the area of innerliner 26 radially outward from the bead wires 22, 24, respectively, for stiffening the bead area to help prevent the tire from bending over the flange 35. Axially outward from apexes 38,39 and between the ply layer 34 where it turns up about bead wires 22,24 are located lower gum chafers 40, 41, respectively, that support the bead wires 22, 24, respectively, in the area of the wheel mounting rim 42 and to prevent chafing of the tire by an adjacent wheel mounting rim. Upper gum chafers 44, 45 are disposed against the lower gum chafers 40, 41, respectively, and the lower tire sidewalls 16b, 18b, respectively, to provide support for the bead wires 22, 24 in the area of the flange 35 and to prevent chafing of the tire by an adjacent wheel mounting rim.

Figure 2A:
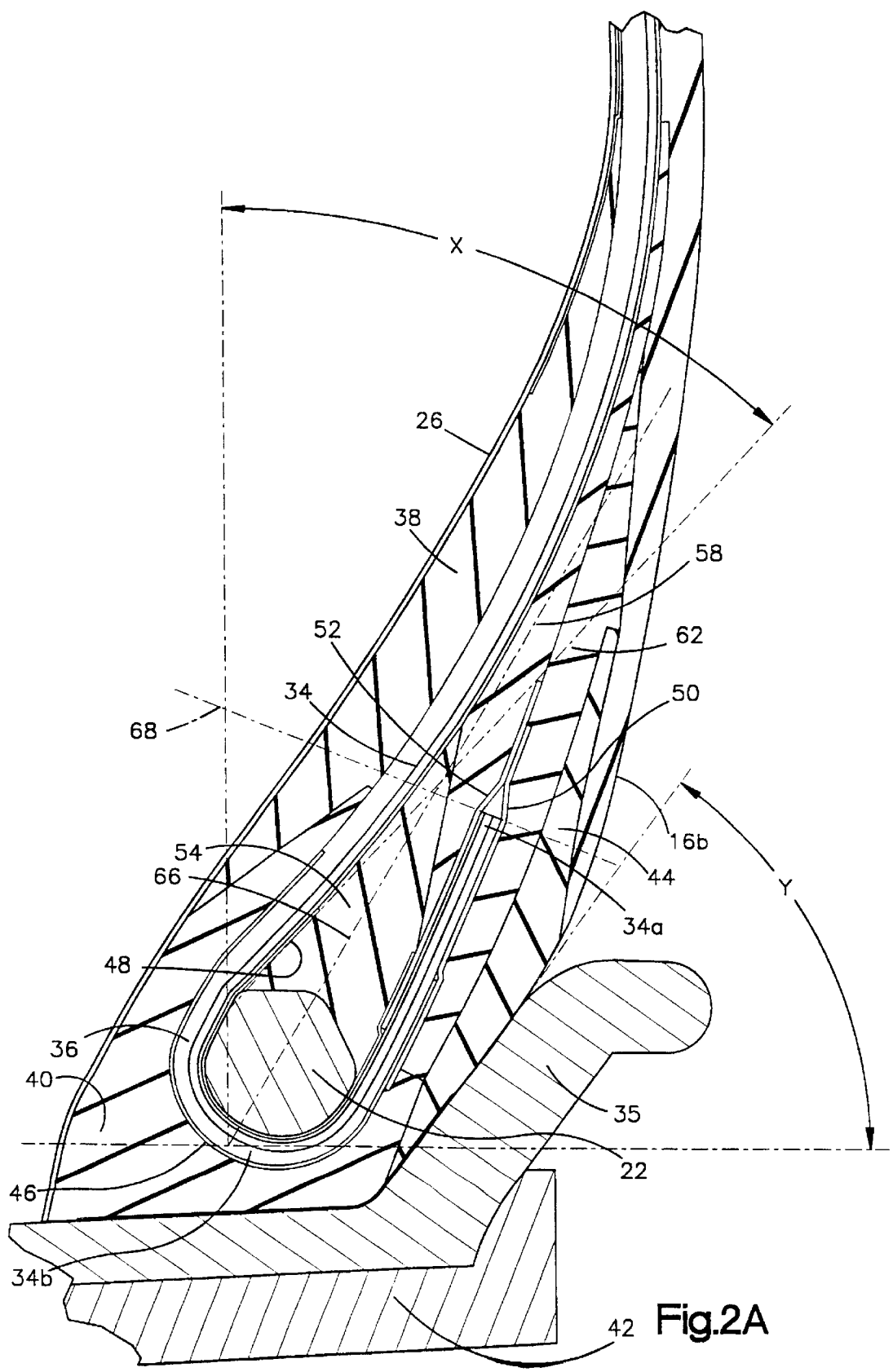
FIG. 2A is an enlarged, cross-sectional view illustrating the bead area of the tire shown in FIG. 2.

Between the lower chafers 40, 41 and the rubber barrier 36 in the area partially surrounding bead wires 22, 24 are located wire chafer plies 46, 47 that support the bead wires 22, 24, respectively. As best seen in FIGS. 2 and 2A, the wire chafer plies 46 are primarily disposed against the inner facing surfaces of lower chafers 40, 41. Between the inner surface of ply layer 34 and the bead wires 22 and 24 are located flippers 48, 49, respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b, respectively, of ply 34 and enable the movement of ply 34 between the gun layers 50 and 52 without exposing the wire within ply 34 during tire construction or severe bending of the tire.

Apex Configuration

Two annular stiffeners, referred to as apexes 54, 55 herein, each having a generally four sided shape, are provide radially outward of the bead wires 22,24, respectively, between flippers 48,49, and out to apexes 58, 59, for stiffening the area about the bead wires 22, 24, respectively, to help prevent the tire from bending over the flange 35. The apexes 54, 55 are further disposed between the lower inner end of rubberized ply layer 34 and the turn up ends 34a and 34b. Abutted against and extending radially outward from the apexes 54 and 55 are two annular stiffeners, referred to herein as apexes 58 and 59, respectively, which helps support the ends 34a and 34b of rubberized ply layer 34. The apexes 54, 55, are constructed of a relatively hard compound having a modulus of about 12.2–14.9 megapascals/cm$^2$ at 200% elongation. Axially outward from the apexes 58 and 59 are the outer apexes 62 and 64, respectively. The apexes 38, 39, 58, 59, and 62, 64 are generally constructed of the same relatively soft rubber compound having a modulus of about 7.2–8.8 megapascals/cm$^2$ at 200% elongation and act to provide a soft cushion that absorbs the stresses around the turn up ends 34a and 34b of the ply layer 34 which is caused by stress forces generated by the flexing of the tire. While the apexes 38, 39, 58, 59, and 62, 64 are typically constructed of the same rubber compound, it is within the terms of the invention to construct one or more of the apexes with a different modulus within the range of between about 7.2 and 8.8 megapascals/cm$^2$ at 200%. In the preferred embodiment, the apexes 38, 39, 58, 60, 62 and 64 are softer than the apexes 54 and 55 which are located directly adjacent and radially outward from the bead wires 22 and 24, respectively. Preferably the rubber compound used to form the apexes 54 and 55 are about 20% to about 50%, and preferably about 20% to about 50% stiffer than the rubber compound used to form apexes 38, 39, 58, 59, 62 and 64.

Location of Carcass Ply Turnup Ends

The location of the ply turnup ends 34a and 34b are an important aspect of the present invention. As best illustrated in FIG. 2A, preferably the turnup ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turnup ends 34a, 34b of ply layer 34 is important in that it can withstand the pressure exerted against the ply end, which was sometimes sufficient to cause the ply end to break through the sidewall in prior art constructions where the turnup ends extend closer to the center of the tire sidewalls. The advantage of having the outer ends of the turnup ends 34a, 34b of carcass ply 34 at a lower position closer to the radial outward portion of the flange 35 is so that when operating conditions cause the tire to deflect outwards, the ends of turnup ends 34a, 34b of the ply layer 34 will be supported by flange 35. This arrangement will greatly reduce the possibility that the outer ends of turnup ends 34a, 34b will be the cause of a crack in or penetrate axially outward through the sidewall of the tire carcass 14.

Natural Ply Line

The ply line of ply layer 34 follows the natural ply line, which means it is already at its natural shape upon inflation. The carcass ply 34 retains its natural shape when inflated to reduce the inflation strain on the tire. The portion of the ply cord extending down to the bead 22 is equally supported along its length by the axially interior surface 37 of the rim flange 35 which is substantially parallel to the centerline 66 passing though beads 22, 24.

Track Belt

The ground engaging, circumferentially extending track belt 12 is removably mounted onto the tire carcass 14. As best shown in FIG. 1, the underside or inner circumference surface 70 of track belt 12 comprises a plurality of annular lands 72 and grooves 74 that mate with lands 76 and grooves 78 of tire carcass 14 to restrain belt 12 from lateral or axial movement with respect to the carcass 14. The tire track belt 12 includes a tread portion 80 and a plurality of tread belts 82, 84, 86, and 88 (82–88). While four tread belts 82–88 are illustrated, is it within the scope of the invention to use other numbers of tread plies as needed. The combination of a removable tire track belt with a tire carcass for use with large earthmoving vehicles is important in that it enables a portion of a tire to be replaced instead of the entire tire in the event that one portion of the tire, i.e., the tire belt or the tire carcass, wears out before the other part. Also, it may be desirable to have different types of tread designs such as for example driving or steering tread designs. This feature allows for a less expensive means of changing the tire tread to construct the appropriate style of desired tire. This feature would greatly reduce the cost of storing spare tires and could even extend the a operating time of the tires.

A unique aspect of the present invention is the provision of zero degree wires 90. The zero degree wires 90 encircle the tire tread and are provided to restrict the radially outward growth of the tread belt 12 due to a serious deflection in the tire carcass. By keeping the tire tread from expanding radially outward, the tire treads will maintain a more flat tread profile which will improve tread life and durability. It will also provide many layers of wire that will provide cut and penetration protection. The positioning of the zero degree wires 90 within the annular lands 72 of the tire tread 12 has two additional advantages. First, when the tire tread belt is being installed on the tire carcass, the tire carcass is inflated and forced outward so that its lands 76 are pressed into the annular grooves 74 disposed about the inner surface of the tire tread belt 12. In the same way, the lands 72 of the tread belt which contain the zero degree wires 90 are pressed into the grooves 20 of the tire carcass 14. However, since the wires 90 prevent the annular lands 76 from expanding radially outward from the crown of the tire carcass 14, the lands 76 are pressed into the grooves 70 formed in the tire belt 12. Since the tire belt can expand slightly more in the areas without the zero degree wires 90, the annular lands 76 have a tendency to press deeper into annular grooves 74 to better support the tire belt 12 on the tire carcass 14. While the zero degree wires 90 are illustrated as being in the annular lands 72, it is also within the scope of the invention to include an additional layer of zero degree wire cable embedded in the belt between the lands 71 and the tread belts 72.

It is apparent that there has been provided in accordance with this invention apparatus and methods for constructing an improved tire and removable track belt assembly wherein the tire durability has been substantially increased by the inclusion of an improved apex construction. The improved tire and removable track belt assembly allows large tires to be transported in several sections and then assembled at the delivery site. Further, the removable track belt assembly allows a different belt to be applied to a tire carcass so as to alter the driving characteristics of the tire quickly and economically.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. An off-the-road track belt pneumatic tire, having an inflatable, multi-layered tire carcass with at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the first carcass ply embedded within the tire carcass and extending entirely about the circumference of the tire and having first and second turnup ends extending axially outwards and turned up about the bead wires; the tire characterized by:

a removable tread belt assembly mounted to the outer circumferential surface of the inflatable tire carcass;

first apex (54/55), second apex (58/59), third apex (38/39), and fourth apex (62/64) elements disposed about each of the bead wires, the first apex elements being located adjacent and radially outward from each of the bead wires, the second apex elements being located adjacent and radially outwards from the first apex elements and between a section of the first carcass ply leading from the circumference of the tire carcass to the bead wires and a section of the first and second turnup ends of the carcass ply, the third apex elements being located axially between a barrier rubber layer and an innerliner and extending radially outward from the bead wires to approximately the middle of the sidewalls, and the fourth apex elements being located against the axially outer facing sides of the first and second turnup ends; wherein the first apex element is constructed of an elastomer which has a greater modulus at 200% elongation than elastomers from which the second apex, third apex and fourth apex elements are constructed.

2. The track belt pneumatic tire of claim 1 characterized in that the first apex element is constructed of an elastomer which has a modulus at 200% elongation of about 12.2 to 14.9 megapascals/cm$^2$, and the second apex, third apex and fourth apex elements are constructed of elastomers which have a modulus at 200% elongation within the range of between about 7.2 and 8.8 megapascals/cm$^2$.

3. A pneumatic earthmover tire, having an inflatable, multi-layered tire carcass with a tread portion disposed about the circumferential surface thereof, the tire carcass comprised of at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the first carcass ply embedded within the tire carcass and extending entirely about the circumference of the tire and having first and second turnup ends extending axially outwards and turned up about the bead wires; the tire characterized by:

first apex (54/55), second apex (58/59), third apex (38/39), and fourth apex (62/64) elements disposed about each of the bead wires, the first apex elements being located adjacent and radially outward from each of the bead wires, the second apex elements being located adjacent and radially outward from the first apex elements and between a section of the first carcass ply leading from the circumference of the tire carcass to the bead wires and a section of the first and second turnup ends of the carcass ply, the third apex elements being located axially between a barrier rubber layer and an innerliner and extending radially outward from the bead wires to approximately the middle of the sidewalls, and the fourth apex elements being located against the axially outer facing sides of the first and second turnup ends; wherein the first apex element is constructed of an elastomer which has a greater modulus at 200% elongation than elastomers from which the second apex, third apex and fourth apex elements are constructed.

4. The earthmover tire of claim 3 characterized in that the first apex element is constructed of an elastomer which has a modulus at 200% elongation of about 12.2 to 14.9 megapascals/cm$^2$, and the second apex, third apex and fourth apex elements are constructed of elastomers which have a modulus at 200% elongation within the range of between about 7.2 and 8.8 megapascals/cm$^2$.

5. An off-the-road track belt pneumatic tire, having an inflatable, multi-layered tire carcass with at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the first carcass ply embedded within the tire carcass and extending entirely about the circumference of the tire and having first and second turnup ends extending axially outwards and turned up about the bead wires; the tire characterized by:

a removable tread belt assembly mounted to the outer circumferential surface of the inflatable tire carcass; and first apex (54/55), second apex (58/59), third apex (38/39), and fourth apex (62/64) elements disposed about each of the bead wires, the first apex elements being located adjacent and radially outward from each of the bead wires, the second apex elements being located adjacent and radially outwards from the first apex elements and between a section of the first carcass ply leading from the circumference of the tire carcass to the bead wires and a section of the first and second turnup ends of the carcass ply, the third apex elements being located axially between a barrier rubber layer and an innerliner and extending radially outward from the bead wires to approximately the middle of the sidewalls, and the fourth apex elements being located against the axially outer facing sides of the first and second turnup ends; wherein the first apex element is constructed of a first elastomer that has at least 20% to about 50% greater modulus at 200% elongation than a second elastomer from which the second apex, third apex and fourth apex elements are constructed.

6. The track belt pneumatic tire of claim 5 further including an interlocking structure to secure the removable tread belt assembly to the inflatable tire carcass.

7. The track belt pneumatic tire of claim 6 characterized in that the interlocking structure includes an interlocking belt structure on the inner surface of the removable tread belt assembly for engaging a complementary interlocking support structure on the outer circumferential surface of the tire carcass.

8. The track belt pneumatic tire of claim 7 characterized in that:

the interlocking belt structure comprises a plurality of circumferentially extending lands and grooves; and the interlocking support structure comprises a plurality of circumferentially extending lands and grooves oriented to engage complementary ones of the circumferentially extending lands and grooves on the inner surface of the removable tread belt assembly to prevent axial movement of the removable tread belt assembly with respect to the outer circumferential periphery of the inflatable load support structure.

9. The track belt pneumatic tire of claim 5 characterized in that the removable tread belt assembly includes a ground contacting tread portion on the outer surface thereof and a plurality of circumferentially extending lands and grooves oriented to prevent axial movement of the removable tread belt assembly with respect to the outer circumferential periphery of the inflatable tire carcass.

10. A pneumatic earthmover tire, having an inflatable, multi-layered tire carcass with a tread portion disposed about the circumferential surface thereof, the tire carcass comprised of at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the first carcass ply embedded within the tire carcass and extending entirely about the circumference of the tire and having first and second turnup ends extending axially outwards and turned up about the bead wires; the tire characterized by:

first apex (54/55), second apex (58/59), third apex (38/39), and fourth apex (62/64) elements disposed about each of the bead wires, the first apex elements being located adjacent and radially outward from each of the bead wires, the second apex elements being located adjacent and radially outward from the first apex elements and between a section of the first carcass ply leading from the circumference of the tire carcass to the bead wires and a section of the first and second turnup ends of the carcass ply, the third apex elements being located axially between a barrier rubber layer and an innerliner and extending radially outward from the bead wires to approximately the middle of the sidewalls, and the fourth apex elements being located against the axially outer facing sides of the first and second turnup ends; wherein the first apex element is constructed of a first elastomer that has at least 20% to about 50% greater modulus at 200% elongation than a second elastomer from which the second apex, third apex and fourth apex elements are constructed.

* * * * *